United States Patent [19]

Tohyama

[11] 4,325,634
[45] Apr. 20, 1982

[54] SLIT WIDTH CALIBRATOR FOR MONOCHROMATOR

[75] Inventor: Shigeo Tohyama, Katsuta, Japan
[73] Assignee: Hitachi, Ltd., Tokyo, Japan
[21] Appl. No.: 89,084
[22] Filed: Oct. 29, 1979

[30] Foreign Application Priority Data

Nov. 2, 1978 [JP] Japan ................... 53-134561

[51] Int. Cl.³ ............................ G01J 3/12; G01J 3/18
[52] U.S. Cl. ........................... 356/331; 356/332; 356/334
[58] Field of Search ................. 356/326, 319, 331–334

[56] References Cited

U.S. PATENT DOCUMENTS 2,741,941  4/1956  Madsen et al. .................. 356/324 X
3,160,697 12/1964  Jacobs et al. ................... 356/326 X
3,748,040  7/1973  Hawes ............................ 356/333

Primary Examiner—Vincent P. McGraw
Attorney, Agent, or Firm—Craig and Antonelli

[57] ABSTRACT

At least one of the entrance slit and the exit slit of a monochromator is capable of being opened or closed. The light issued from the exit slit when the slit width is changed is detected by a light detector. The slit width is calibrated when the ratio between the maximum value of the output of the light detector and the output of the light detector with the slit being gradually closed subsequently reaches a predetermined value, in other words, when a predetermined narrowness of the slit is attained. The slit width is controlled by a pulse motor or the like. The pulses supplied to the pulse motor are counted by a counter. At the time of slit width calibration, a value corresponding to the particular slit width is set in the counter, thus performing the slit width calibration.

16 Claims, 8 Drawing Figures

SLIT WIDTH CALIBRATOR FOR MONOCHROMATOR

BACKGROUND OF THE INVENTION

1. Field of the Invention

This invention relates to an apparatus for calibrating the slit width of the monochromator used for the spectrophotometer.

2. Description of the Prior Art

In a spectrophotometer, the accuracy of the wavelength and the slit width are the most important performance factors affecting the characteristics of the apparatus. Especially in high-class apparatuses, such factors are required to be adjusted to a theoretical limit both structurally and mechanically. Further, such an adjusting mechanism must have an especially rugged construction which can stand vibrations of transportation and changes with time.

In conventional spectrophotometers, a mechanical coupling is used to actuate a wavelength driving means and a slit driving means for the purpose of adjusting the wavelength and slit width.

In other words, the conventional spectrophotometers are such that the wavelength is adjusted by a wavelength adjusting device coupled to a wavelength pickup mechanism or a wavelength counter, and the slit width is adjusted by a stepwise switching system in which the slit width is changed by relocating a slit plate having a plurality of slits or by a continuous variable system in which a pair of slit blades in opposed relation to each other are opened or closed thereby to adjust the slit width continuously. The former system has a high accuracy of slit width but in view of the impossibility to change the slit width continuously, it is used only for comparatively low-class apparatuses. The latter system, on the other hand, which can continuously change the slit width, is used with high-class apparatuses. In the spectrophotometer of the continuously variable type, the slit width is generally indicated by use of a dial or counter mechanically coupled to a slit width changing mechanism. The resulting disadvantage is that if this mechanism is displaced even slightly during transportation or with time, the particular displacement affects the slit width directly, thus reducing the accuracy of the spectrophotometer.

SUMMARY OF THE INVENTION

An object of the present invention is to provide an apparatus in which the slit width can be calibrated with high accuracy.

Another object of the invention is to provide an apparatus in which the slit width can be calibrated easily.

According to the present invention, there is provided a slit width calibrator for the spectrophotometer in which the slit width is calibrated by opening or closing the slit of the spectrophotometer in such a manner as to achieve a predetermined ratio of the output of a light detector to the maximum value thereof.

DESCRIPTION OF THE PREFERRED EMBODIMENTS

Figure 1:
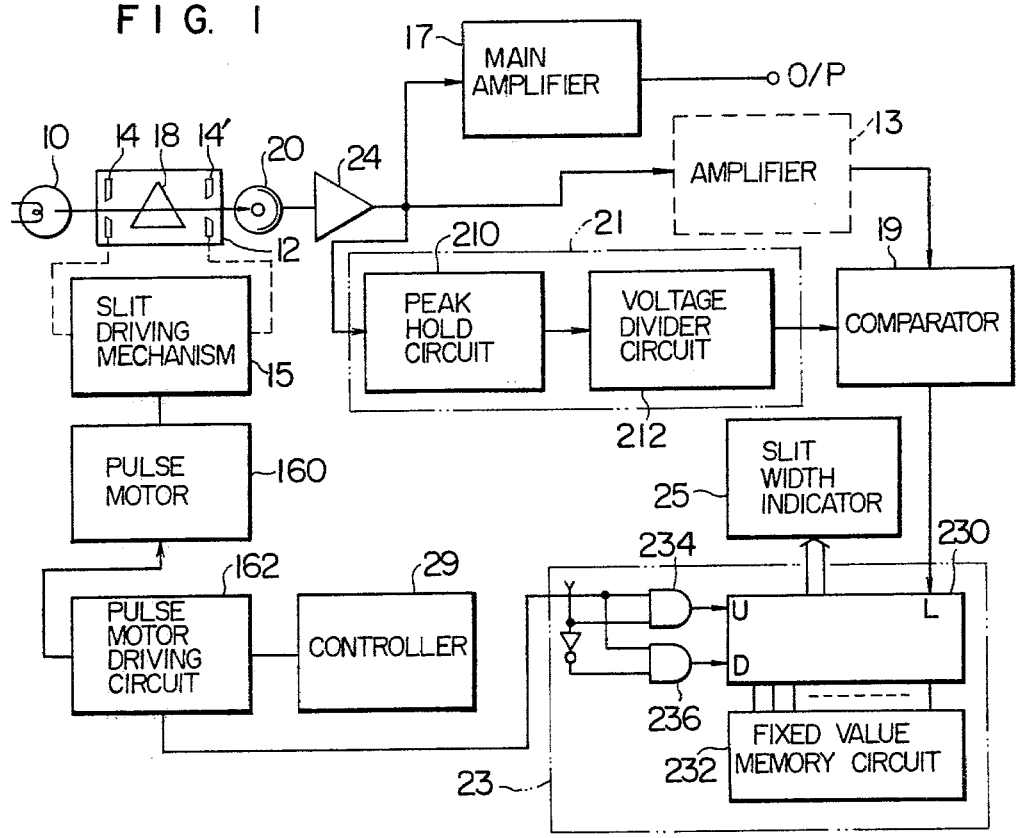
FIG. 1 is a block diagram showing an embodiment of the present invention.

An embodiment of the present invention will be described with reference to FIG. 1. A ray of light generated at a light source 10 is introduced from an entrance slit 14 of a monochromator 12. The width of the entrance slit 14 is variable by a slit driving mechanism 15. The light introduced from the entrance slit 14 is dispersed by a light dispersing element 18 such as a diffraction grating or a prism. Only a specific component of the light dispersed leaves an exit slit 14' and is converted into an electrical signal by a light detector 20. The exit slit and the entrance slit are interlocked with each other and driven by a single slit driving mechanism. As the light dispersing element 18 is driven by the wavelength driving mechanism, the wavelength is scanned. The slit driving mechanism 15 and the wavelength driving mechanism of various types are well known and such mechanisms other than that shown in FIG. 2 are disclosed, for example, in U.S. Pat. Nos. 3,098,408 and 3,868,499 and U.S. Pat. No. 4,102,576 already filed by the present applicant. The slit driving mechanism 15 is driven by a pulse motor 160 which is controlled by a pulse train generated from a pulse motor driving circuit 162. Various types of pulse motor driving circuit 162 are well known, one example thereof is disclosed in U.S. Pat. No. 4,145,643. The pulse motor may be replaced by an ordinary DC motor and a rotary encoder. A pre-amplifier 24 is for amplifying the output of the light detector 20. A memory 21 is for storing the maximum output of the pre-amplifier 24 associated with the full width of the slit to which it is opened by the slit driving mechanism 15. A comparator 19 is actuated upon detection that the ratio between the stored maximum output and the output produced with the slit width changed to a closing direction reaches a predetermined value. A slit width counter 23 keeps in store a set slit width corresponding to the above-mentioned predetermined value and sets a value corresponding to the set slit width in a counter 230 at the time point when the comparator 19 is actuated. Subsequently, the counter 230 counts a value corresponding to the number of slit-opening/closing pulses produced from the driving circuit 162 for driving the pulse motor 160 for the slit driving mechanism 15. A slit width indicator 25 is for indicating the output of the counter 230. In this drawing, reference numeral 17 shows a main amplifier for amplifying the output of the pre-amplifier 24 to a proper level.

The operation of this embodiment will be explain below. The light generated from the light source 10 becomes monochromatic light by the light dispersing element 18, is converted into an electrical signal by the light detector 20, further amplified to an object output by the main amplifier 17 and produced as an output signal from an output terminal.

When a main switch of the spectrophotometer is turned on or set in a calibration mode, a slit-opening/closing pulse train is generated at the driving circuit 162 in response to a command from the controller 29. The slit driving mechanism 15 is capable of varying the slit width continuously and periodically from minimum slit width to maximum slit width. The peak hold circuit 210 of the memory 21 is for storing the maximum output of the pre-amplifier 24 in the course of continuous slit opening or closing operation. The maximum output stored in the peak hold circuit 210 is divided in voltage by a voltage divider circuit 212. If the maximum slit width is 10 and the slit width to be attained by calibration is 1, the voltage-dividing ratio $N(0 < N < 1)$ of 1/100 may be attained against the maximum energy in view of the fact that energy changes in proportion to the square of the slit width. Even after the maximum output is stored in the peak hold circuit 210, the slits 14 and 14' are sequentially narrowed and the output of the pre-amplifier 24 is also decreased sequentially. The decreasing output of the pre-amplifier 24 is compared with the output of the voltage-divider circuit 212 in the comparator 19. When the output of the pre-amplifier 24 coincides with that of the voltage divider circuit 212, the comparator 19 generates a coincidence signal. In response to this coincidence signal, the counter 230 is loaded with the value stored in the fixed value memory circuit 232. The fixed value memory circuit 232 is constructed in a logic in which the number of counts given to the slit width at the time of coincidence is encoded in hardware fashion. This point will be explained more specifically. Assume that the range of the slit width variable by the slit driving mechanism 15 is from 0.01 nm to 6.4 nm. The slit width changes at the rate of 0.01 nm for each pulse generated by the driving circuit 162. Generally, the slit width is indicated by either of two different known ways. One is to indicate the slit width in nm as actual width, and the other in nm in terms of bandpass. These indications are proportional to each other. For example, 6.4 nm corresponds to 4 mm. Generally, the bandpass indication is used more often.

If the bandpass at the time of slit width calibration is 0.2 nm, it is 1/32 of the maximum slit width. Thus energy is 1/1024, so that the voltage dividing ratio of the voltage dividing circuit 212 is set at 1/1024. The counter 230, on the other hand, takes the form of binary coded decimal counter (BCD counter), and the fixed value memory circuit 232 has a logic "20" converted into BCD code in hardware fashion. When the coincidence signal is applied to the counter 230, therefore, "20" is set in the counter 230. The indication of the slit width is made possible by using a 7-segment decoder/-divider and a 7-segment display element as the slit width indicator 25 connected to the counter 230. The slit width is indicated on the indicator 25 as "0.20" nm by selecting a position of a decimal point. After calibration of the slit width, the pulse from the driving circuit 162 is applied through one of the AND gates 234 and 236 to the UP or DOWN terminal of the counter 230. The slit width calibration is made at 0.2 nm but not at 0.01 nm of minimum slit width for the reason mentioned below. If the slit width is as narrow as 0.01 nm, noise increases resulting in a lower S/N ratio. This makes an accurate decision of 0.01 nm difficult. The S/N ratio of 10 or more is properly required for slit width calibration. As explained above, the S/N ratio of 10 or more for 0.2 nm is attained in the case of the monochromator very bright or high in F-number. In the case of a dark monochromator, therefore, the slit width at the time of calibration is naturally larger, resulting in a greater voltage dividing ratio N of the voltage dividing circuit 212. When the voltage dividing ratio is about 1/100, voltage division is possible by a simple resistance method. In case of the voltage dividing ratio of 1/1024 as above, however, a simple resistance method cannot achieve a sufficiently high accuracy. In such a case, an amplifier 13 of predetermined amplification factor shown by dashed line in FIG. 1 is recommended. In other words, the voltage dividing ratio of 1/32 of the voltage dividing circuit 212 and the amplification factor of 32 of the amplifier 13 provide a substantial voltage dividing ratio of 1/1024.

In the spectrophotometer having a slit mechanism of continuous variable type, the maximum slit width is generally as large as 10 to 200 times the minimum slit width (limit of resolution). Assume that the maximum slit width is 100 times the minimum slit width and that the slit width changing mechanism changes linearly. Also assume that the maximum slit width is calibrated with a line spectrum. Unless the accuracy as high as 1/100 of the calibrated value is obtained, the resolution for minimum slit width cannot be guaranteed. It is assumed that in the spectrophotometer with the slit width variable between 0.5 mm and 5 mm, the calibrated value is 5 mm and the actual slit width is 4.95 mm (accuracy of 1/100). If the slit width is set at 0.05 mm after calibration, the slit closes by 4.95 mm ($=5-0.05$), and therefore the actual slit width is 0 ($=4.95-4.95$) resulting in a very great error for the minimum slit width.

Assume on the other hand that calibration is made in the vicinity of minimum slit width. Even if the actual slit width is 0.055 mm (accuracy of 1/10) for the calibrated value of 0.05 mm, setting at 5 mm results in an actual slit width of 5.005 mm ($=5+0.005$). This indicates a very small error.

The position of optimum slit width calibration may be detected by a mechanical method using a pick-up such as a microswitch. In the method for detecting the position of a narrow slit width mechanically, however, adjustment is necessary to actuate the pick-up at or in the vicinity of the optimum slit width. This in turn makes it necessary to take into consideration the displacement of the position of pick-up actuation with time and resistance to vibrations and shocks, thus making slit width calibration of sufficiently high accuracy difficult.

According to the present invention, by contrast, the slit width is temporarily maximized and the slit width is calibrated at a value which is equivalent to one divided by a predetermined number electrically in the ratio between the output of the light detector associated with such a value and the output of the light detector associated with the maximum slit width, thus making very accurate slit width calibration possible.

Also, since the slit width is not calibrated mechanically, the calibration is not affected by time nor by vibration, thereby achieving an accurate slit width calibration.

An example of the slit driving mechanism is shown in FIG. 2. In this drawing, reference numerals 150 and 150' are parallel springs for closing or opening the slit 14 keeping it parallel, numeral 152 shows connecting pins for opening or closing the slit 14, numeral 154 is a seesaw lever rotated about the support 154a, and numeral 156 is a roller in contact with the periphery of the slit driving cam 158. When the slit driving cam 158 which is an eccentric cam is rotated with the pulse motor 160 driven, the seesaw lever 154 vertically moves about the supporting point 154a. This movement is imparted to the slit 14 through the connecting pins 152. Since the slit blades 14 are supported by the parallel spring 150 and 150', the slit 14 is opened or closed with the blades thereof always maintained in parallel.

Another embodiment will be described with reference to FIG. 3. In this diagram, the reference numerals indentical to those in FIG. 1 denote the same component elements as in FIG. 1.

The output of the light detector 20 is applied to the comparator 260 of the peak discriminator 26. The comparator 260 produces an output when the output of the light detector 20 is larger than a predetermined level. This comparator 260 is used for preventing noise in the output of the light detector 20 from erroneously actuating the peak discriminator 26. The switch 262 is turned on by the signal from the comparator 260 and causes the output of the light detector 20 to be applied to the differentiator 264. Whether a peak is reached or not is decided by determining whether or not the differentiated value of the input signal is zero or not. The output of the differentiator 264 is thus applied to the zero detector 266. The zero detector 266 generates a coincidence signal when the input signal is zero. This coincidence signal is converted into an analog gate signal by the gate circuit 268. The output signal of the peak discriminator 26 is applied to the strobe terminal ST of the data register 31.

Numeral 30 shows an A/D converter. Various A/D converters including counting type and comparison types are known. This embodiment illustratively uses a ramp type, dual slope type or sequential comparison type or other type using a counter 300. The A/D converter 30 includes, in addition to the counter 300, a circuit for generating a pulse in response to an analog input and a circuit for timing control of A/D conversion, which are not shown in the drawing. The output of the light detector 20 is converted into digital signals sequentially by the A/D converter 30. In other words, the data in the counter 300 is latched by the latch circuit 302 at appropriate timing, so that the data in the latch circuit 302 is taken out as parallel digital signals. If the counter 300 has a 12-bit data, for example, the data register 31 is configured to latch the data of the upper 6 bits of the counter 300. In other words, the data of the counter 300 shifted by 6 bits, i.e., the data 1/1024 of the data of the counter 300 is latched in the data register 31. The instant the peak is discriminated by the peak discriminator 26, the data of the counter 300 is latched in the register 31 in response to the output signal of the peak discriminator 26. The data latched in the register 31 is 1/1024 of the maximum output of the light detector 20. After the data 1/1024 of the maximum output is obtained in this way, the slits 14 and 14' are narrowed sequentially, thus reducing the output of the light detector 20. This output is converted into a digital signal by the A/D converter 30 and taken out of the latch circuit 302. On the other hand, the 6-bit output of the data register 31 is applied as the lower 6-bit of the 12-bit comparator circuit 33, to which the 12-bit output of the latch circuit 302 is also applied, so that both of these inputs are compared in the comparator circuit 33. When these two input signals coincide with each other, a coincidence signal is produced from the comparator circuit 33 and applied to the slit width counter 23. The configuration and operation of the slit width counter 23 are already mentioned. On the basis of this coincidence signal, a predetermined value of slit width is set in the internal counter.

According to the present embodiment, the slit width can be calibrated with very high accuracy.

In the above-mentioned embodiment, the maximum output is stored in the peak-hold circuit. In this analog memory system, the time length for which the memory is held depends on the time constant of the circuit and is not very long. Therefore the maximum slit width must be changed to the optimum width for a very short length of time. For this purpose, a high-speed pulse motor or the like is used which is comparatively high in cost. According to this embodiment, by contrast, where the maximum output is stored in digital fashion, the above-mentioned time limitation is eliminated, thus making it possible to use a low-cost pulse motor.

Further, the maximum output may be multiplied by a predetermined constant very easily and accurately by use of a bit shift or other digital techniques.

Figure 4:
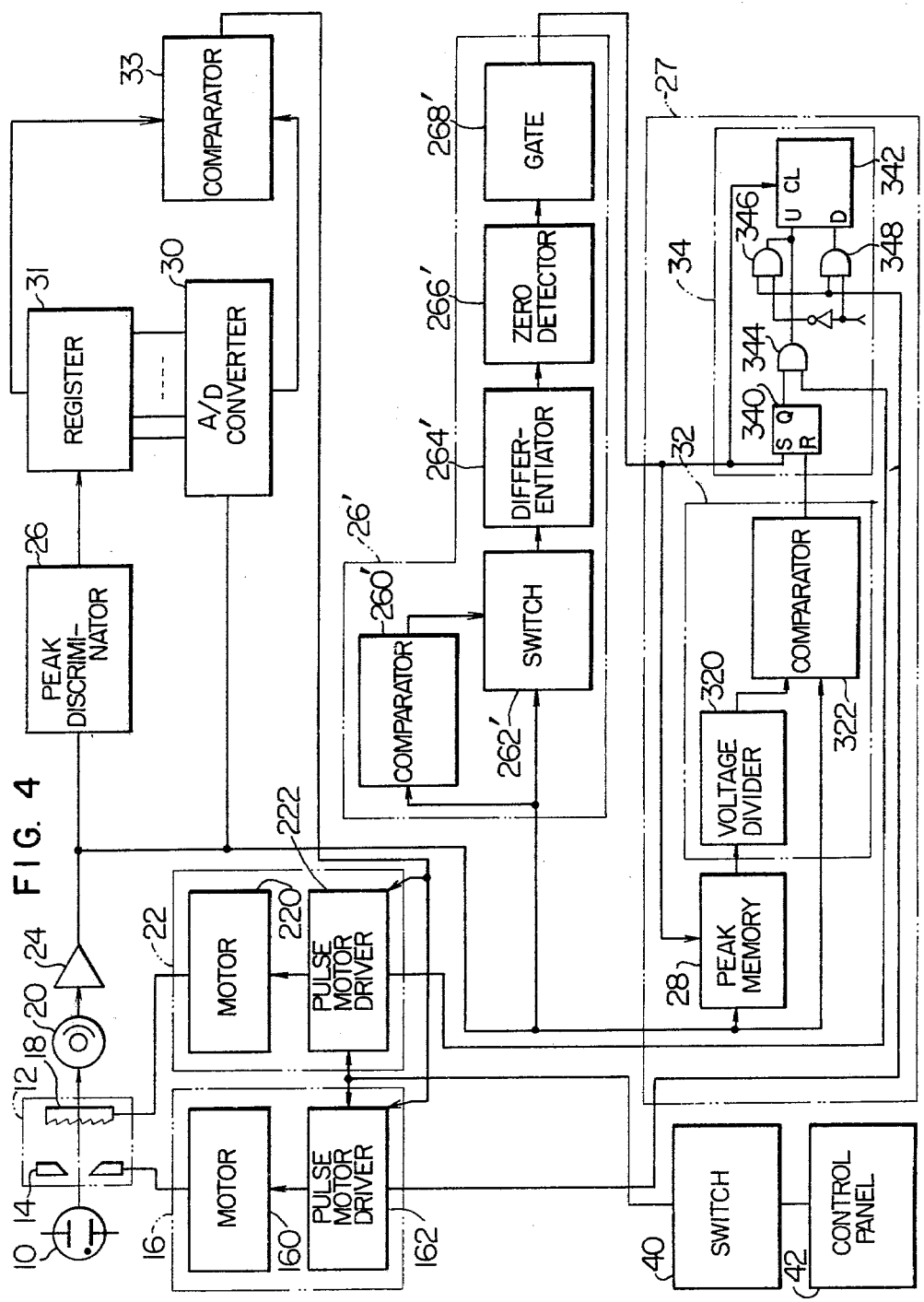
FIG. 4 is a block diagram showing a further embodiment of the present invention.

Another embodiment will be explained with reference to FIG. 4 in which the reference numerals similar to those in FIG. 1 denote similar component elements.

The entrance slit 14 is driven by the slit width control pulse motor 160 of the slit drive mechanism 16, while the light dispersing element 18 is driven by the wavelength drive pulse motor 220 of the wavelength drive mechanism 22. The pulse motors 160 and 220 are controlled by the pulse motor drivers 162 and 222 respectively.

When the peak discriminator 26 detects the maximum output of the pre-amplifier 24, the value of 1/1024 is latched in the register 31. The output of the A/D converter 30 is compared with the output of the register 31 by the comparator circuit 33 which produces a coincidence signal if both signals coincide with each other. This coincidence signal is applied to the pulse motor driver 162, for instance, thus stopping the pulse motor 160. In other words, the slit 14 is maintained to predetermined width. When this coincidence signal is applied to the pulse motor driver 222, on the other hand, the pulse motor 220 is driven, thus starting the wavelength scanning.

The light source 10 may or may not have a line spectrum. Light sources having a line include a mercury lamp, a hollow cathode lamp, a xenon lamp and a deuterium discharge tube. Light sources other than these generally have a line spectrum. The deuterium discharge tube is especially effective for the spectrophotometer of ultraviolet ray and visible light range. The deuterium discharge tube, which has a strong continuous spectrum in the ultraviolet region of 200 nm to 300 nm, is used as an ordinary light source on the one hand and has a line spectrum at 656.1 nm in the range not used normally on the other hand. The light source 10 may not have a line spectrum, in which case the zero order light may be used as will be described later.

In the case where a deuterium discharge tube in used as the light source 10, the operation of placing the slit width at a predetermined value is performed in the wavelength range of 200 nm to 300 nm. If the line of 656.1 nm of the deuterium discharge tube is used for slit width calibration, the above-mentioned wavelength scan is conducted toward this line wavelength. In the case of an ordinary ultraviolet visible type spectrophotometer, a tungsten lamp is used for the range from 300 nm to 900 nm. In setting the slit width to a predetermined width, therefore, the tungsten lamp may be used at or about 680 nm and then in response to the coincidence signal from the comparator circuit 33, the light source may be switched from the tungsten lamp to the deuterium discharge tube automatically for the purpose of wavelength scan.

During the period when the light dispersing element 18 is continuously scanned by the wavelength drive mechanism 22, the peak discriminator 26 continues to seek the peak of the output of the pre-amplifier 24. When the peak discriminator 26 detects a peak, the spectrophotometer coincides with the line spectrum wavelength.

The output signal of the peak discriminator 26' is applied to the pulse memory 34. The signal applied to the pulse memory 34 sets the flip-flop 340 on the one hand and clears the up-down counter 342 on the other hand. When the flip-flop 340 is set, the AND gate 344 opens. The other input terminal of the AND gate 344 is impressed with a pulse from the pulse motor driver 222. The pulses that have passed the AND gate 344 are applied to the up input terminal of the counter 342. On the other hand, the peak memory 28 memorizes a peak value in response to the output signal of the peak discriminator 26'. A sample hold circuit may be used as the peak memory 28. If the output of the peak discriminator 26' is not used, a peak value detector circuit may be used. The value held in the peak memory 28 is voltage-divided by one half at the voltage divider circuit 320 and applied to one input terminal of the comparator 322. The other input terminal of the comparator 322 is impressed with the output of the light detector 20 varying with wavelength scanning. The flip-flop 340 is reset by the output signal produced the instant the two input signals of the comparator 322 become equal to each other. Thus the AND gate 344 is closed and the counter 322 ceases to count. Under this condition, the data stored in the counter is the amount of wavelength scan from peak to half the peak, which value is equivalent to one half of half width of the spectrum. Assuming that the wavelength scan is 1 nm and that the wavelength scan for the pulse motor driver 222 is at the rate of 0.005 nm/pulse, then 200 pulses are produced by the pulse motor driver 222. Thus the count standing at the counter 342 is "200". If the counter 342 is a BCD up-down counter, the indication of "20 nm" is easily obtained by using a 7-segment decoder/driver and by displacing the decimal point at the same time. The foregoing description concerns the wavelength scan of 1.0 nm, in which case the half width of the spectrum is 2.0 nm. Thus, the data directly indicates the slit width.

On the other hand, the slit width varies at the rate of 0.01 nm/pulse due to the pulses generated from the pulse motor driver 162. The pulses generated from the pulse motor driver 162 are applied to either an up or down input terminal of the counter 342 through the AND gate 346 or 348 selected by a "0" or "1" signal for discriminating the forward or reverse motion for varying the slit width.

These processes of operation should preferably be performed automatically beforehand immediately after energization of the spectrophotometer as described above. Therefore, the switch 40 so functions that any signal is not applied to the control panel 42 during the period from the energization start to the completion of calibrating operation.

In the above-mentioned case, the wavelength changes at the rate of 0.005 nm/pulse in response to the pulses generated from the pulse motor driver 222, and at the rate of 0.01 nm/pulse in response to the pulses generated from the pulse motor driver 162. Any other ratio between these change rates is made possible by use of a frequency divider or the like.

In the above-mentioned embodiment, the comparator 32 seeks a time point when the output of the pre-amplifier 24 becomes one half of the peak output stored in the memory 28. The ratio between the output of the pre-amplifier 24 and the peak output, however, is not limited to one half but may take another ratio such as 1/4. Since the spectrum has a triangular form symmetric with respect to the peak, one half of the spectrum width associated with 1/4 of the peak output represents a band pass. The band pass is easily indicated by frequency-dividing the output pulses of the pulse motor driver circuit appropriately by a frequency divider. Thus a desired ratio is available. Nonetheless, the normal concept of the band pass makes 1/2 a desirable alternative.

In the above-mentioned embodiment, the wavelength is formed on the basis of the peak wavelength of a line spectrum. However, it may alternatively be based on the zero order light. The zero order light, which unlike the line spectrum is not a monochromatic light, has nevertheless a peak like the line spectrum. Thus it is possible to use the zero order light for slit width calibration. In the spectrophotometer for the ultraviolet and visible range from 200 nm to 900 nm, for instance, the zero order light appears at the wavelength of 0 nm. The zero order light, therefore, may be detected by setting the monochromator in the vicinity of 0 nm. The slit width may be calibrated by the zero order light in a manner similar to the method mentioned above.

Further, according to the above-mentioned embodiment, the pulse memory 34 is cleared by the gate 268' and closed by the signal of the comparator 32. This operation may be repeated and averaged for a higher accuracy.

Also, the motion of the wavelength drive pulse motor may be reversed so that the pulses generated until a wavelength one half on the opposite side to that of the above-mentioned embodiment with respect to the peak wavelength are counted. Thus the sum of these pulses and the pulses associated with the above-mentioned embodiment may be used for conversion into the number of pulses corresponding to the half width.

As another alternative, when the output of the pre-amplifier 24 becomes one half of the peak, the pulse memory 34 is cleared and the motion of the wavelength drive pulse motor is reversed at the same time, so that the pulses are counted during the period until an opposite one half of the peak is attained, and the resulting count is used as the number corresponding to the half width. In this case, a circuit configuration slightly different from that of the embodiment of FIG. 4 is used. Specifically, if the comparator 322 produces a positive pulse after detection of a coincidence, the flip-flop 340 may be done without. The output of the comparator 322 is connected immediately to the clear terminal CL of the counter 342 and the pulse motor drive circuit 222, while the output of the comparator 322 is connected to one input terminal of the AND gate 344 through an inverter. Thus in response to the output of the comparator 322, the counter 342 is cleared, so that the pulse motor driver circuit 222 generates a reversing signal. Since the reversing of the pulse motor is delayed in time slightly, the first coincidence output signal of the comparator 322 turns on the AND gate 344 thus starting to count. In response to the second coincidence output signal of the comparator 322, on the other hand, the AND gate 344 is cut off, thus stopping the counting.

In any case, when the number of pulses corresponding to the half width is counted by the pulse memory 34, the pulse memory 34 is required to be connected with a frequency divider of 1/2 in dividing ratio.

In the above-mentioned embodiment, the slit width is calibrated immediately after energization of the spectrophotometer. This calibration, however, is not limited to the time point immediately after energization of the spectrophotometer, but may be effected at a desired time point as required.

In the case of a spectrophotometer of the ultraviolet and visible range, it is desirable to use a deuterium discharge tube for calibration of the slit width as described above. In other types of spectrophotometer, different types of lamp are desirable. For the fluorescence spectrophotometer, for instance, the xenon lamp is used, while the hollow cathode lamp or mercury lamp is used with the atomic absorption photometer. These lamps, however, have a plurality of lines, and therefore the bright lines must be discriminated for calibration. This calibration is easily effected by setting the reference value of the comparator 260' slightly larger, on the one hand, and setting the calibration-start point in a manner mentioned with reference to the undermentioned embodiment while at the same time setting the direction of wavelength scan for calibration from the short wavelength toward long wavelength or in opposite direction.

In all the above-mentioned embodiments, the calibration work may not be accomplished successfully if the line spectrum is too strong or weak. In order to obviate such a disadvantage, the configuration similar to the above-mentioned embodiment is required to further include a discriminator A (not shown) for discriminating the magnitude of the output of the pre-amplifier 24, a gain controller B for controlling the gain of the light detector 20 in accordance with the output of the discriminator A, and an alarm indicator C for issuing an alarm when the gain controller B (not shown) increases the gain beyond the upper limit.

According to this embodiment, the signal from the pre-amplifier 24 is applied also to the discriminator A. The discriminator A is operated by the output signal of the peak discriminator 26', and comprises an upper comparator $A_1$ (not shown) and a lower comparator $A_2$ (not shown), thus making up what is called a window comparator. The comparator $A_1$ produces a positive signal in response to an input signal thereto larger than a predetermined value. The comparator $A_2$, on the other hand, produces a positive signal in response to an input signal thereto smaller than a predetermined value. In the event that the output signal of the pre-amplifier 24 is so strong that the light detector is likely to be saturated, the comparator $A_1$ of the discriminator A issues a command for reducing the gain to the switch $B_2$ (not shown) of the gain controller B. In response to that signal, the gain controller B increases or decreases the gain of the light detector 20, as the case may be. Upon actuation of the switch $B_1$ (not shown), the predetermined voltage $V_1$ is amplified by the reversing amplifier $B_3$ (not shown). Upon actuation of the switch $B_2$, the predetermined voltage $V_1$ is amplified by the amplifier $B_4$ (not shown), and the sum of the output signal of the amplifier $B_3$ (not shown) and the reference voltage $V_0$ is amplified by the buffer amplifier $B_5$ (not shown). The output signal of the amplifier $B_5$ is boosted to a high voltage by the DC-DC converter D (not shown) thus changing the gain of the light detector 20. Further, the very instant the gain controller C (not shown) issues a command, the output of the pre-amplifier 24 undergoes a change, and therefore to neglect this variation, the controller C produces to the peak discriminator 26 a change-ignoring signal.

Figure 2:
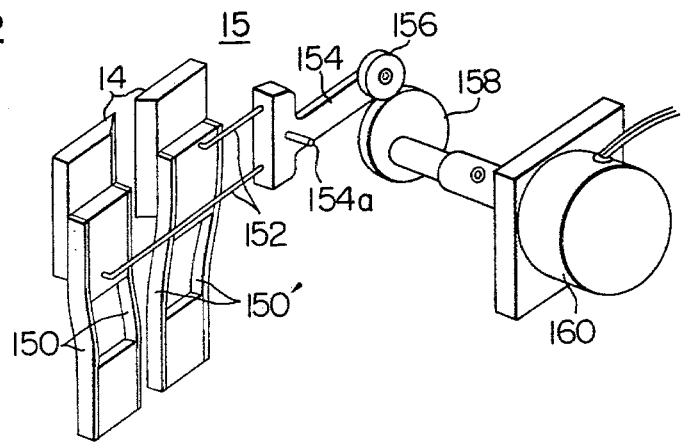
FIG. 2 is a diagram for explaining the operation of an example of a slit driving mechanism.
Figure 3:
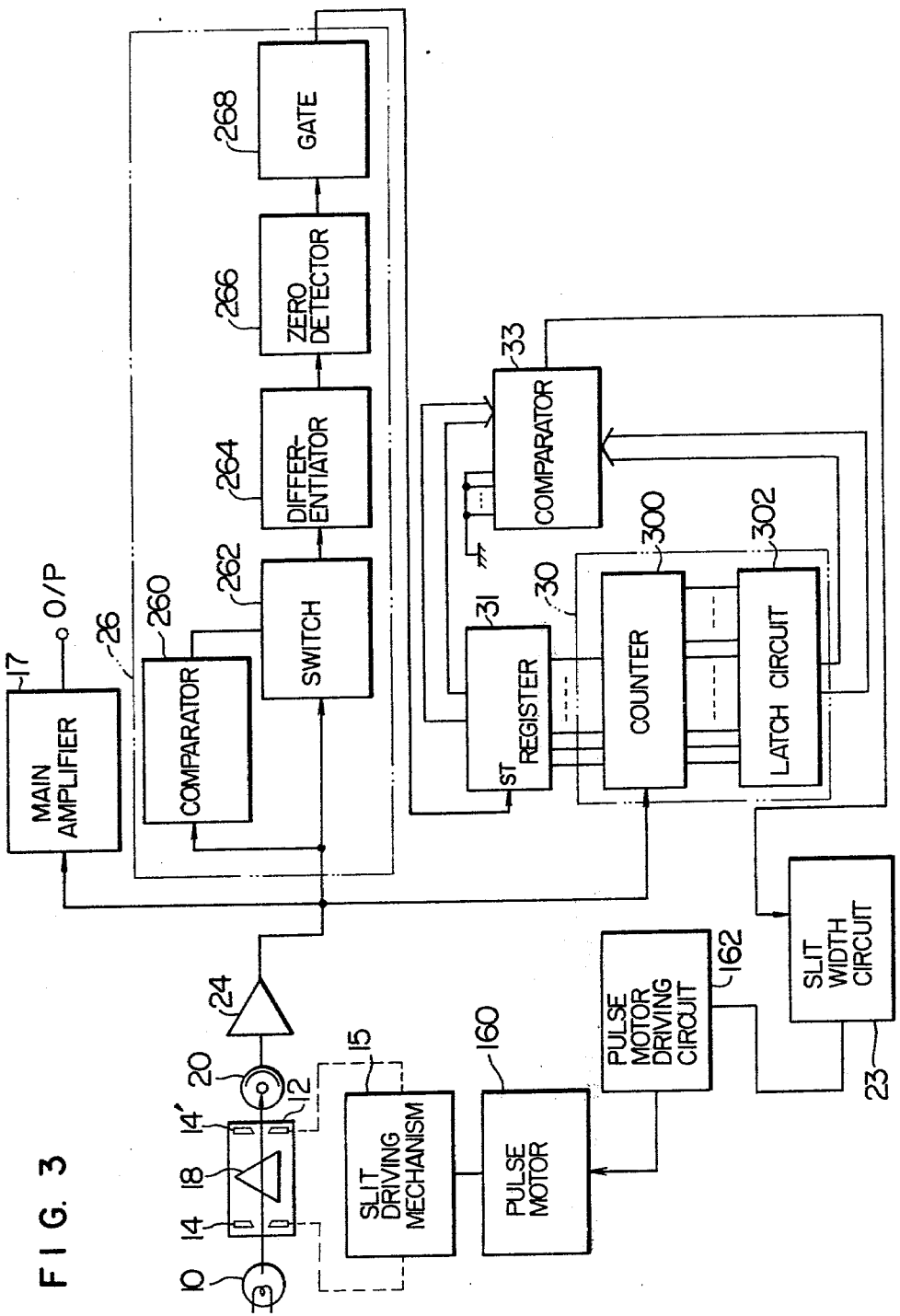
FIG. 3 is a block diagram showing another embodiment of the present invention.

In the embodiments of FIGS. 1 and 3, a predetermined value is set as a slit width in the counter at a predetermined position of slit width in advance. According to the embodiment under consideration, by contrast, slit width calibration is repeated by use of a bright line spectrum at the most suitable slit width calibrating position, thus improving the accuracy even further.

Figure 5:
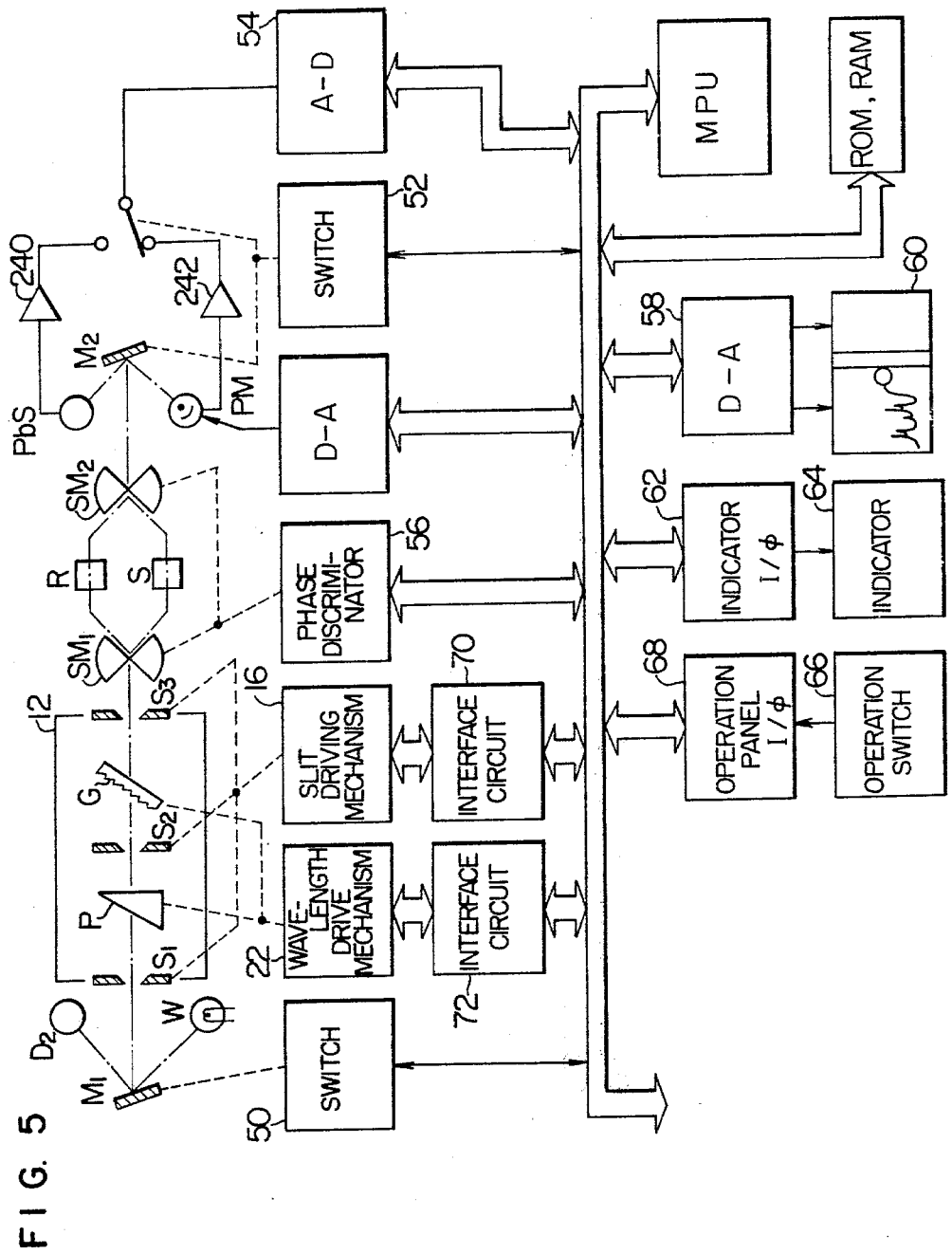
FIG. 5 is a block diagram showing an embodiment using a CPU.
Figure 6:
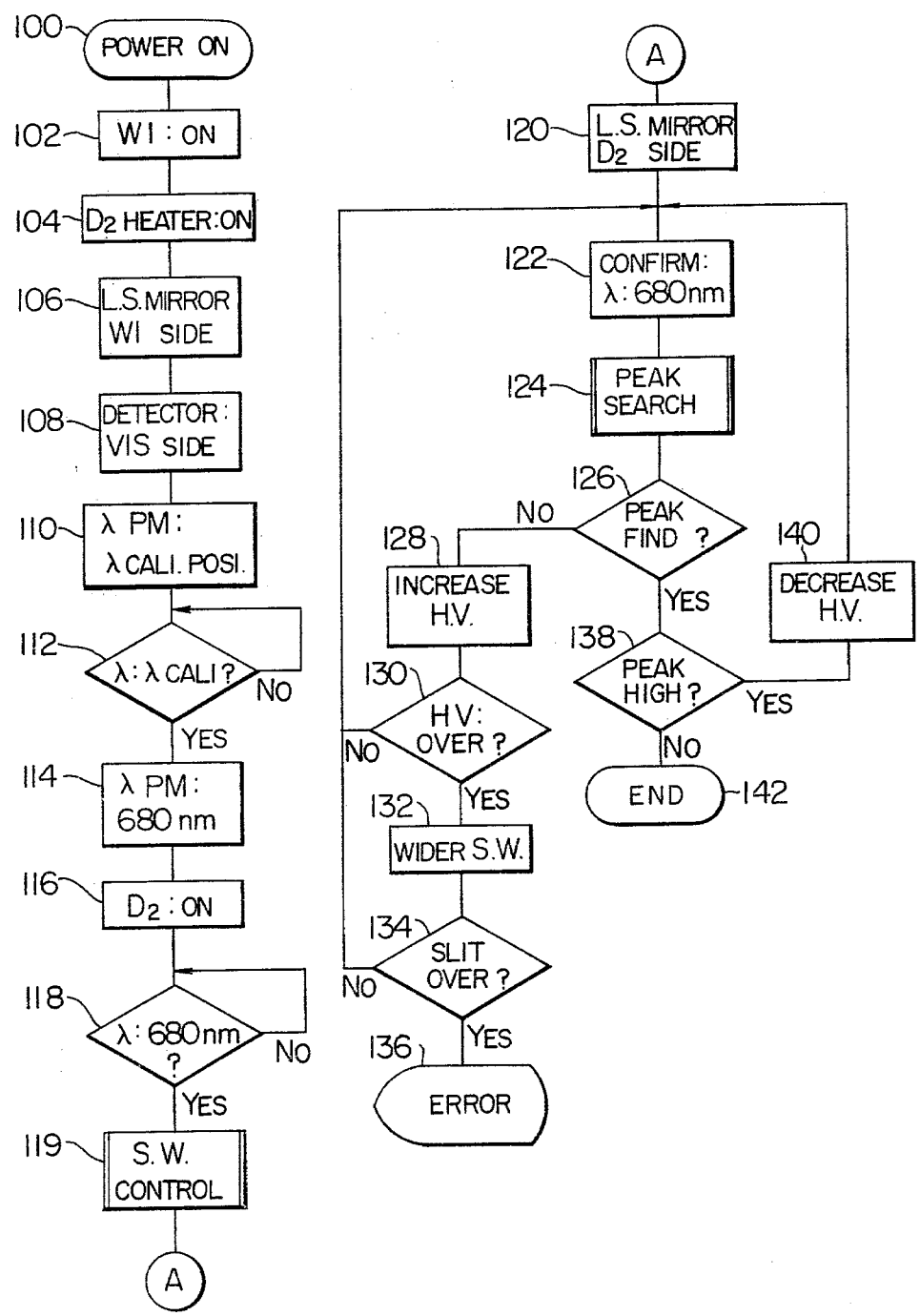
FIGS. 6 to 8 show flowcharts for operation of the embodiment of FIG. 5.

In the embodiment mentioned above, the calculation process is performed by each block. Instead of this method, the calculation may be performed by computer. FIG. 5 shows an embodiment of the spectrophotometer according to the present invention in which the calculation is made by computer.

First, the configuration of this embodiment will be described. The light source is comprised of a tungsten lamp W and a deuterium discharge tube $D_2$, which are adapted to be switched by the mirror $M_1$. The spectroscope provides a double monochromator including a diffraction grating G and a prism P. Centered on the microprocessor MPU, the program is fixed in ROM while RAM is used for storage of variable data. The wavelength of the monochromator is scanned as the prism and the diffraction grating are simultaneously driven by the pulse motor under control of the computer. An optical element switching command generated by the computer on the basis of the wavelength is transmitted to the switches 50 and 52 for automatic switching. As a sensor, a photomultiplier PM for ultraviolet and visible region, or a PbS photoconductive cell for near infrared rays. The light measuring output is applied through the pre-amplifier 24 to the A-D converter 54 where it is converted into a digital signal and applied to the computer, and discriminated into and stored as a reference signal R, a sample signal S and a zero signal Z on the basis of the signal from the phase discriminator 56 which is obtained in synchronism with the sector mirrors $SM_1$ and $SM_2$ for splitting the light flux. The transmission %T of these light measuring signal is determined by the digital calculation of $(S-Z)/(R-Z)$ or the absorbance thereof obtained by digital log conversion thereof. These values, together with the wavelength value, are applied through the 2-channel D-A converter 58 so that the spectrum is recorded in the X-Y recorder 60. Further, the reference signal R or the specimen signal S is compared with a predetermined value stored in ROM and subjected to control by dinode feedback or slit servo control through the computer to attain an optimum value. The other data including the wavelength or light measurement is indicated on the 7-segment light-emitting diode indicator 64 through the indicator I/$\phi$ 62, so that the conditions of the operating switch 66 are read by the computer through the control panel I/$\phi$ 68.

In this embodiment, the outputs of the pre-amplifiers 240 and 242 are converted into digital signals by the A/D converter 54. The pulse motors of the wavelength drive mechanism 22 and the slit drive mechanism 56 are controlled by the interface circuits 70 and 72 respectively. The operation of calibrating the slit width explained with reference to the above-mentioned embodiment is performed by the computer MPU.

The operation of slit width calibration will be explained with reference to the flow charts of FIGS. 6 to 9. After the power supply is turned on (terminal 100), the tungsten lamp WI and the heater of the deuterium discharge tube $D_2$ are turned on (steps 102 and 104). After that, the light source mirror $M_1$ is switched to the tungsten lamp (step 106), while the sensor mirror $M_2$ is switched to the visible region side (step 108). Next, for rough adjustment of the wavelength, the wavelength scanning pulse motor λPM is driven toward the rough adjustment point (step 110) which is set at about 920 nm. This wavelength is a long wavelength in visible region. Detection of the rough adjustment point is effected by microswitch or the like. At step 112, the rough adjustment causes the wavelength scanning pulse motor λPM to be driven to the position of 680 nm (step 114). This operation is performed for driving the pulse motor to the vicinity of wavelength calibration point. While this operation is commanded, the deuterium discharge tube $D_2$ is turned on (step 116). At step 118, the wavelength is set at 680 nm, followed by the slit width control at step 119. The slit width control will be explained later with reference to FIG. 7. Then, the light source mirror $M_1$ is switched to the deuterium discharge tube $D_2$ (step 120). After the position of 680 nm is confirmed at step 122, the peak is searched for at step 124. The peak search will be explained later with reference to FIG. 8. If a peak is not found at the judgement step 126, the high voltage of the photomultiplier tube PM is increased at step 128. At the judgement step 130, whether or not the high voltage is boosted to high is confirmed, and if there is no abnormality, a peak is searched for gain. When the high voltage is higher than a predetermined level, the slit width is widened at step 132. At the decision step 134, whether or not the slit width is widened too much is decided and if there is no abnormality, a peak is searched for once again. In the case where the slit width is larger than a predetermined value, there exists an abnormality such as the deuterium discharge tube $D_2$ burnt out and an error is indicated at display section 136. If a peak is detected at the judgement step 126, whether or not the peak value thereof is too high is judged at the judgement step 138. If it is too high, the high voltage is reduced. In the case where the peak value is normal, by contrast, calibration is completed (terminal 142).

Figure 7:
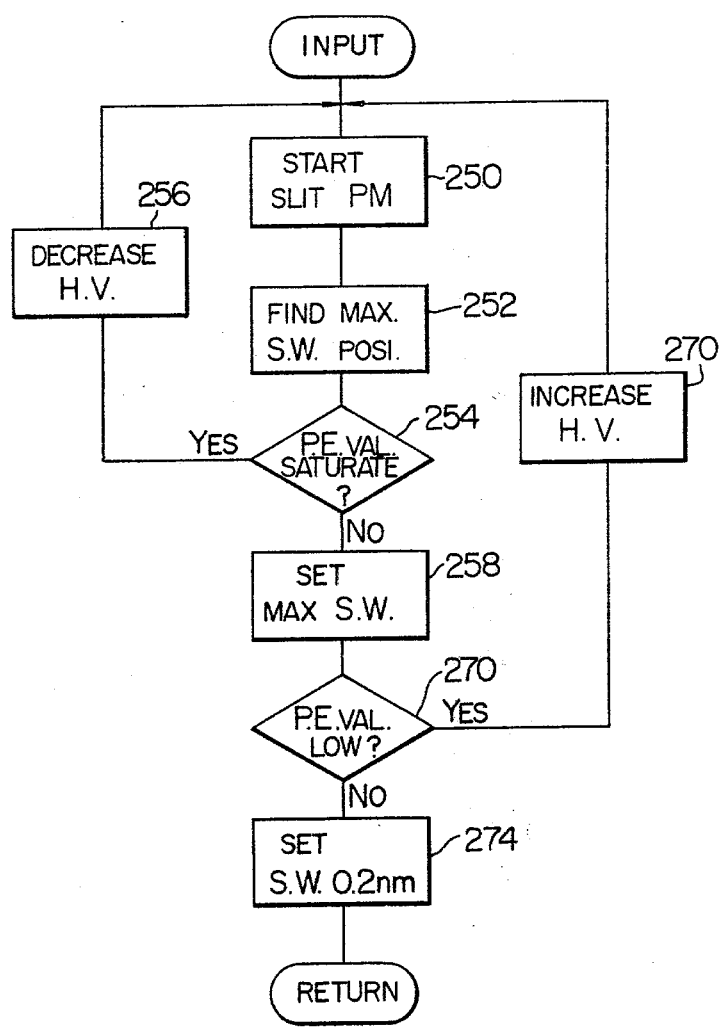

Next, explanation will be made of the slit width control with reference to FIG. 7. At step 250, the slit drive pulse motor is started. At the step 252, the slit width position where the output of the light detector is maximum is determined. This is possible by comparing the read data sequentially as in the flow from steps 153 to 176 shown in FIG. 8. At step 252 for obtaining the maximum output, it is decided whether or not the photo electric value is saturated (judgement step 254). If it is saturated, the high voltage applied to the light detector is decreased at step 256. And if it is not saturated, the slit width is set at the maximum value obtained at step 252 (step 258). Whether or not the photo electric value at that time is too low is decided at the judgement step 270. If it is too low, the high voltage is increased at step 272, while it is not too low, the slit width is set at 0.2 nm at step 274. The maximum slit width is 6.4 nm under this condition, and the slit width may be set at 0.2 nm by reducing the photo electric value to 1/1024 at step 274 for the slit width of 6.4 nm.

Figure 8:
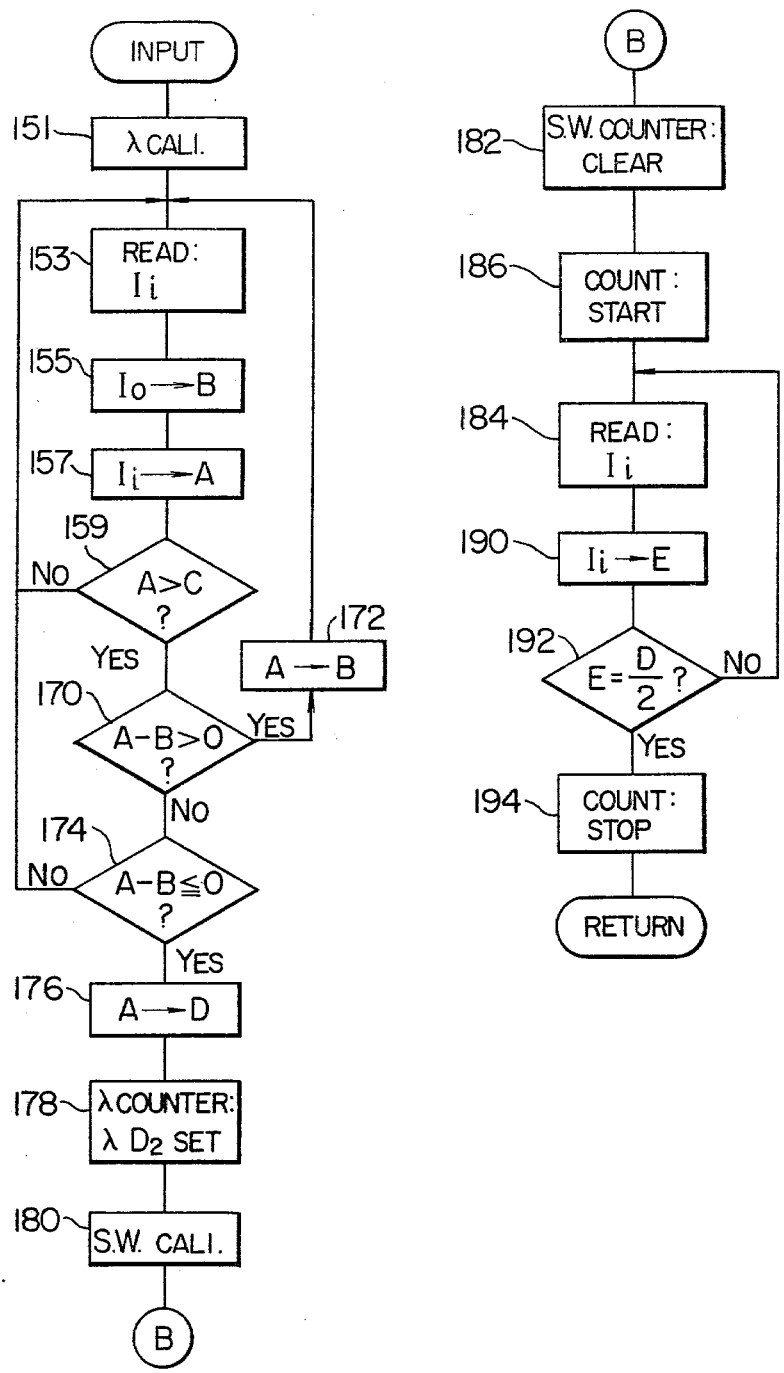

Next, the peak search will be explained with reference to FIG. 8. At step 151, the wavelength calibration is started. At the input 153, the output signal Ii of the light detector is read sequentially. The first output signal Io is stored in the memory B (step 155), and subsequent output signals Ii are stored in the memory A (step 157). Whether or not the value stored in the memory A is larger than the predetermined value C is decided at step 159. This is performed for the purpose of preventing an erroneous detection due to a noise. Detection of the fact that the value stored in the memory A is larger than the predetermined value C is equivalent to the detection of a rise of a peak. Subsequently, therefore, the output signal Ii increases simply up to the peak value. At the judgement step 170, it is decided whether or not the value stored in the memory A later is larger than the value stored in the memory B previously. If the value stored in the memory A is larger, the value stored in the memory A is stored in the memory B (step 172). If the value stored in the memory B is larger, by contrast, the peak may have been detected and whether or not it is detected is decided at the decision step 174. The value stored in the memory A at that time is the peak value and is stored in the memory D at step 176. At the same time, the peak wavelength of 656.1 nm of the bright line spectrum of the deuterium discharge tube $D_2$ is set in the wavelength counter at the step 178, followed by the slit width calibration at step 180. For this purpose, the slit width counter is cleared at step 182. And the output signal Ii of the light detector is read at the input 184, thus starting the counting at step 186. The output signal Ii thus read is stored in the memory E at step 190, and whether or not the value stored in memory E is $\frac{1}{2}$ of the value stored in memory D is decided at step 192. If it is decided affirmatively at step 192, it is when the half value of the slit width is detected. When the decision at step 192 is affirmative, the counting stops (step 194).

What is claimed is:

1. A slit width calibrator for a monochromator having a light source and a slit having a variable slit width for picking up a monochromatic light of a desired wavelength from the light generated from said light source, comprising:
    a light detector for detecting the light emitted through said slid, said light detector providing a maximum value output corresponding to a maximum slit width;
    controlling means for changing the width of said slit and generating pulses in a number corresponding to the change in slit width;
    counting means for counting the pulses generated from said controlling means; and
    calibrating means for calibrating the content of said counting means to a fixed value corresponding to a predetermined width of said slit at the time when a ratio of the output of said light detector to the maximum value thereof reaches a predetermined value dependent of said predetermined slit width while changing the slit width by said controlling means.

2. A slit width calibrator for monochromator according to claim 1, wherein said calibrating means includes signal generating means for generating a coincidence signal when said ratio reaches said slit-width dependent predetermined value, and memorizing means for memorizing preliminarily said fixed value being set in said counting means in response to said coincidence signal.

3. A slit width calibrator for monochromator according to claim 2, wherein said signal generating means includes second memorizing means for memorizing a first value corresponding to the maximum output of said light detector detected during the change of the slit width by said controlling means, first multiplying means for multiplying said first value by a predetermined value smaller than unity, and comparing means for comparing the output of said first multiplying means with the output of said light detector while changing the slit width by said controlling means, said comparing means generating said coincidence signal when the output of said first multiplying means coincides with the output of said light detector.

4. A slit width calibrator for monochromator according to claim 3, further comprising second multiplying means for multiplying the output of said light detector by a predetermined value larger than unity, said comparing means comparing the output of said first multiplying means with the output of said second multiplying means and generating said coincidence signal when said outputs coincide with each other.

5. A slit width calibrator for monochromator according to claim 2, wherein said signal generating means includes an analog-to-digital converter for converting the output of said light detector into a digital signal, peak detecting means for generating a signal at the peak of the output of said light detector, second memorizing means for memorizing a pair of bits, in higher order, of the output of said analog-to-digital converter in response to the signal from said peak detecting means, and comparing means for comparing the output of said second memorizing means with the output of said light detector converted into a digital signal, while changing the slit width by said controlling means, said comparing means generating said coincidence signal when said outputs coincide with each other.

6. A slit width calibrator for a monochromator having a slit having a variable width for dispersing the light generated from a light source and picking up monochromatic light of a desired wavelength from the dispersed light, comprising:
a light detector for detecting the light emitted through said slit, said light detector providing a maximum value output corresponding to a maximum slit width;
controlling means for changing the width of said slit and generating pulses in a number corresponding to the change in slit width;
counting means for counting the pulses generated from said controlling means; and
calibrating means for detecting that a ratio of the output of said light detector to the maximum value thereof reaches a predetermined value and setting into said counter means a value representing the width of said slit located at the time when said predetermined value is reached by said ratio to calibrate the counter means.

7. A slit width calibrator for monochromator according to claim 6, further comprising wavelength scanning means for scanning the wavelength by rotating a light dispersion element of said monochromator,
said calibrating means including signal generating means for generating a coincidence signal when said ratio reaches said slit-width dependent predetermined value, means responsive to said coincidence signal to stop the slit-width changing operation of said controlling means, and slit width determining means for determining said slit width representing value from a span in wavelength scanned, by said wavelength scanning means between the time when the output of said light detector reaches a predetermined peak value and the time when the output of said light detector reaches a predetermined value smaller than said pre-predetermined peak value.

8. A slit width calibrator for monochromator according to claim 6, wherein said calibrating means includes signal generating means for generating a coincidence signal when said ratio reaches said slit-width dependent predetermined value, said slit-width representing value being set into said counting means in response to said coincidence signal.

9. A slit width calibrator for monochromator according to claim 8, wherein said signal generating means includes memorizing means for memorizing a first value corresponding to the maximum output of said light detector detected during the change of the slit width by said controlling means, first multiplying means for multiplying said first value by a predetermined value smaller than unity, and comparing means for comparing the output of said first multiplying means with the output of said light detector while changing the slit width by said controlling means, said comparing means generating said coincidence signal when said outputs coincide with each other.

10. A slit width calibrator for monochromator according to claim 9, further comprising second multiplying means for multiplying the output of said light detector by a predetermined value larger than unity, said comparing means comparing the outputs of said first multiplying means and said second multiplying means with each other and generating said coincidence signal when said outputs coincide with each other.

11. A slit width calibrator for monochromator according to claim 8, wherein said signal generating means includes an analog-to-digital converter for converting the output of said light detector into a digital signal, peak detecting means for generating a signal at the peak of the output of said light detector, second memorizing means for memorizing a portion of bits, in higher order, of the output of said analog-to-digital converter in response to the signal from said peak detecting means, and comparing means for comparing the output of said second memorizing means with the output of said light detector converted into a digital signal while changing the slit width by said controlling means, said comparing means generating said coincidence signal when said outputs coincide with each other.

12. A slit width calibrator for monochromator according to claim 7, wherein said predetermined peak value is a value of the peak of a predetermined line spectrum generated by said light source.

13. A slit width calibrator for monochromator according to claim 7, wherein said predetermined peak value is a value of the peak of the zero order light spectrum, and said light dispersion element is a diffraction grating.

14. A slit width calibrator for monochromator according to claim 6, wherein said controlling means includes a pulse generator, a pulse motor driven by pulses generated by said pulse generator, and converting means for converting the rotational motion of said pulse motor into the width-changing motion of said slit.

15. A slit width calibrator for monochromator according to claim 6, wherein said controlling means includes a motor, converting means for converting the rotational motion of said motor into the width-changing motion of said slit, and an encoder for generating pulses in a predetermined relationship with the rotational motion of said motor.

16. A slit width calibrator for monochromator according to claim 6, wherein said predetermined value of said ratio is selected such that when said ratio reaches said predetermined value, said slit is located at a slit-width condition where the S/N ratio of the output of said light detector is not less than a predetermined value.

* * * * *